Patented Aug. 5, 1947

2,424,992

UNITED STATES PATENT OFFICE 2,424,992

METHOD OF MAKING A PHOSPHORIC ACID COMPOSITION

Royal Lee, Milwaukee, Wis., assignor to Lee Foundation for Nutritional Research, Milwaukee, Wis., a corporation of Wisconsin No Drawing. Application May 12, 1944,
Serial No. 535,382

4 Claims. (Cl. 252—193)

The present invention relates to compositions of matter containing phosphoric acid, and to a method of making the same.

An object of the invention is to provide an improved composition of matter which shall form a dry source of phosphoric acid, particularly adapted for use in foods, beverages and medicinal preparations.

Another object is to provide a composition of matter in which phosphoric acid is uniformly applied in a susbtantial amount to a carrier of pulverized starchy material to form a dry product which is relatively non-hygroscopic and which is free from carbonized particles or dark specks.

A further object is to provide an improved method of acid application which shall effect uniform dispersion of the phosphoric acid in the carrier and permit impregnation of the carrier with a relatively large amount of the acid.

A still further object is to provide a method which shall facilitate drying of the acid-bearing product and which shall maintain the finely pulverized condition of the carrier.

The invention further consists in the several features hereinafter described and claimed.

In carrying out the method of the invention to form the product of the invention, phosphoric acid is applied to a carrier of pulverized starchy material and forms therewith a relatively non-hygroscopic dry powder. A suitable form of phosphoric acid is the so-called 85% type, which is a syrupy liquid and is quite hygroscopic. The acid is diluted with, or dissolved in, a suitable volatile organic solvent, such as ethyl alcohol or acetone or a mixture of either with di-ethyl ether, thus forming a thin colorless liquid, the acid and solvent being present in approximately equal amounts. The solution is mixed with finely pulverized dry starch to permeate or impregnate the absorbent starch particles, the starchy material being preferably a sago starch or a specially prepared corn starch of a type known commercially as "Melojel." These types of starch have a relatively high capacity for the phosphoric acid, without danger of carbonization. It is usually sufficient to dampen the starch with the solution, without forming a paste. The mixing is preferably effected by spraying or dripping the solution onto the starchy material in a rotary agitating mixer having provision for air or gas circulation. The solvent is then evaporated, as by applying a slight heat. If desired, vacuum drying may be employed. The resulting product is normally a fine white dry powder which contains up to about one-third by weight of phosphoric acid uniformly dispersed therein, the powder being relatively non-hygroscopic. The proportion of phosphoric acid in the dry product can readily be adjusted by the strength of the solution, a larger proportion of solvent decreasing the acid content in the product.

The solvent used preferably contains ether, which may constitute about 20% by volume of the solvent. The ether content aids in the evaporation of any small amount of water which may be present, and has the effect of maintaining the finely pulverized condition of the starch. With certain types of organic solvents, the starch may tend to form clumps or coarse particles after the acid application, but the dry product may be reduced by grinding.

The powder forms a dry source of phosphoric acid and is particularly suitable for use in foods, beverages and medicinal preparations, where the presence of phosphoric acid is desired. In some instances the dry product may be mixed with other ingredients, such as fruit flavors, to form a beverage powder. In the case of a beverage, the acid-bearing starch may produce a slight cloudiness in the liquid, but this is not objectionable, and in some instances is considered desirable. The product is also useful as the filler and acid constituent of baking powders, as in a mixture containing a suitable bicarbonate, such as sodium bicarbonate. In such case only a relatively small amount of the acid is required, as compared with conventionally used acid constituents, and the amount of the residue after the reaction is relatively small.

The dry acid-bearing composition is conveniently packaged, either alone or in mixture with other substances, and remains chemically inactive when kept dry. The acid is uniformly distributed or dispersed through the starch particles, avoiding any tendency to carbonize or produce dark specks in the starch or in baked goods containing the starch.

The invention is also applicable to the production of self-rising flours, in which case the phosphoric acid content of the pulverized starchy material can be somewhat lower, as on the order of 10% by weight.

What I claim as new and desire to secure by Letters Patent is:

1. A method comprising admixing comminuted starchy material with a solution of phosphoric acid in a volatile organic solvent, and then evaporating the solvent to produce a relatively non-hygroscopic dry comminuted product having phosphoric acid dispersed therein.

2. A method comprising admixing comminuted starchy material with a solution of phosphoric acid in a volatile organic solvent containing approximately 20% of ether, and then evaporating the solvent.

3. A method comprising admixing comminuted starchy material with a solution of a highly concentrated liquid phosphoric acid in a volatile organic solvent, and then evaporating the solvent to produce a relatively non-hygroscopic dry powder.

4. A method comprising admixing comminuted starchy material with a solution of liquid phosphoric acid of the 85% type in a volatile organic solvent, and evaporating the solvent to produce a relatively non-hygroscopic dry powder.

ROYAL LEE.

REFERENCES CITED

The following references are of record in the file of this patent:

UNITED STATES PATENTS

| Number | Name | Date |
| --- | --- | --- |
| Re. 11,981 | Just | Apr. 29, 1902 |
| 14,722 | Horsford | Apr. 22, 1856 |
| 2,195,596 | Nitardy | Apr. 2, 1940 |

FOREIGN PATENTS

| Number | Country | Date |
| --- | --- | --- |
| 312,562 | Great Britain | May 30, 1929 |